(12) United States Patent
Xu et al.

(10) Patent No.: US 10,989,696 B2
(45) Date of Patent: Apr. 27, 2021

(54) ULTRASONIC TESTING DEVICE AND METHOD

(71) Applicant: BEIJING INSTITUTE OF TECHNOLOGY, Beijing (CN)

(72) Inventors: Chunguang Xu, Beijing (CN); Canzhi Guo, Beijing (CN); Juan Hao, Beijing (CN); Wanxin Yang, Beijing (CN); Xianchun Xu, Beijing (CN); Ruili Jia, Beijing (CN); Xinhao Zheng, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 16/910,993

(22) Filed: Jun. 24, 2020

(65) Prior Publication Data
US 2021/0033566 A1   Feb. 4, 2021

(30) Foreign Application Priority Data

Jul. 31, 2019 (CN) .......................... 201910702849.6

(51) Int. Cl.
*G01N 29/28* (2006.01)
*G01N 29/04* (2006.01)

(52) U.S. Cl.
CPC ............. *G01N 29/28* (2013.01); *G01N 29/04* (2013.01); *G01N 2291/0231* (2013.01); *G01N 2291/0289* (2013.01); *G01N 2291/10* (2013.01)

(58) Field of Classification Search
CPC .... G01N 29/28; G01N 29/04; G01N 2291/10; G01N 2291/0289; G01N 2291/0231
See application file for complete search history.

(56) References Cited

U.S. PATENT DOCUMENTS

| | | | | |
|---|---|---|---|---|
| 2,697,936 | A | * 12/1954 | Farrow ................. | G01N 29/28 73/617 |
| 4,726,231 | A | * 2/1988 | Tretout ................. | G01N 29/28 73/632 |
| 5,469,744 | A | * 11/1995 | Patton .................... | G01N 29/28 73/644 |

(Continued)

FOREIGN PATENT DOCUMENTS

| CN | 101078617 A | 11/2007 |
|---|---|---|
| CN | 207020130 U | 2/2018 |

*Primary Examiner* — Suman K Nath
(74) *Attorney, Agent, or Firm* — John A. Miller; Shumaker, Loop & Kendrick, LLP

(57) ABSTRACT

An ultrasonic testing device that can make a robotic testing system reach the surface of a complex curved composite workpiece that is not easy to reach and perform a quality testing. By pumping a coupling liquid into the device so that the coupling liquid enters a waveguide and jets onto the surface of the workpiece, an ultrasonic wave can be transmitted in the waveguide and reach the surface of the workpiece and penetrate the workpiece, thereby achieving the purpose of quality testing of the workpiece. By providing two ultrasonic testing devices without a waveguide on both sides of a tested workpiece, respectively, and by mounting the waveguide on one side or both sides of the ultrasonic testing devices, it is possible to transmit the ultrasonic waves to the surface of the workpiece or to receive the ultrasonic waves from the surface of the workpiece.

4 Claims, 4 Drawing Sheets

(56) References Cited

U.S. PATENT DOCUMENTS

Figure 1:
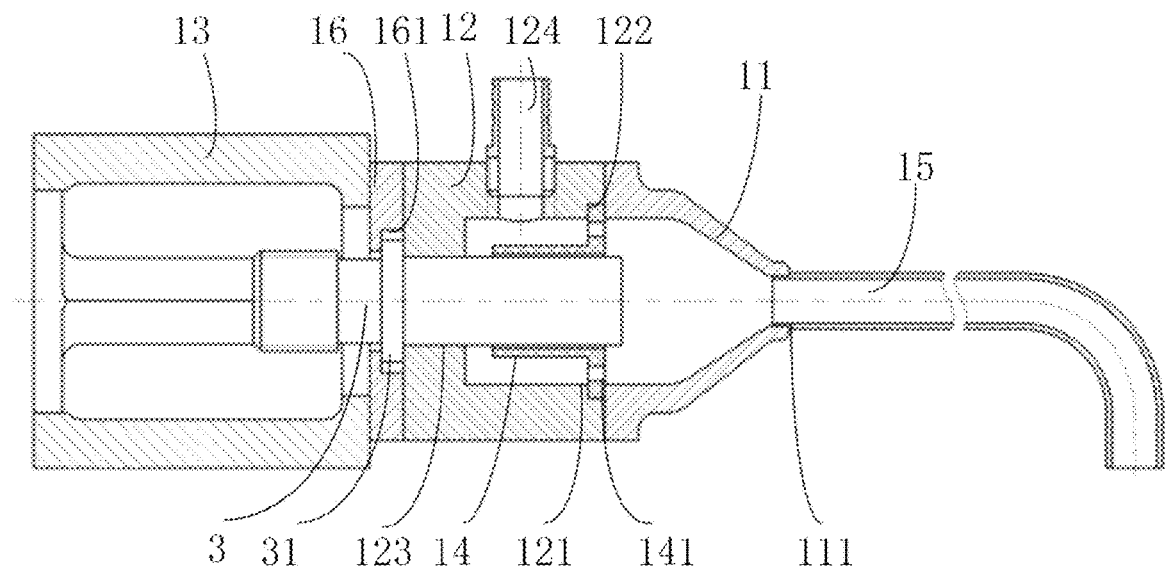

| 2005/0279157 | A1* | 12/2005 | Villalba | G01N 29/28 |
| | | | | 73/54.41 |
| 2007/0175282 | A1* | 8/2007 | Fetzer | G01N 29/223 |
| | | | | 73/649 |
| 2018/0284072 | A1* | 10/2018 | Pfortje | G01N 29/226 |

* cited by examiner

ULTRASONIC TESTING DEVICE AND METHOD

CROSS REFERENCE RELATED TO APPLICATIONS

This application claims the benefit of U.S. Provisional Application No. 201910702849.6, filed on Jul. 31, 2019. The entire disclosure of the above application is incorporated herein by reference.

TECHNICAL FIELD

The present disclosure belongs to the technical field of non-destructive ultrasonic testing, and in particular to an ultrasonic testing device and method.

BACKGROUND

With the development of material science and manufacturing technology, an increasing number of complex-shaped workpieces, especially composite material workpieces with advantages of high strength, high rigidity, high temperature and pressure resistance, fatigue resistance and corrosion resistance, are applied in aerospace, military, automotive and other fields. The quantity of application and the application level of composite materials has become one of the important signs of the advanced nature of modern aviation equipment.

Due to the complex manufacturing process of the composite material workpiece, it is inevitable to involve defects such as cracks, holes, delamination and likes during manufacturing process and service of the workpiece, which will have a direct impact on the quality of the workpiece. In the field of aerospace, in order to ensure the quality and safety of the composite material workpiece, comprehensive and reliable non-destructive testing of the composite material workpiece is required in the application-service process of the composite material workpiece.

In the testing of composite material workpieces, ultrasonic transmission testing method is generally used because of the large attenuation of ultrasonic energy in composite materials. It is relatively easy to implement the automatic ultrasonic testing for simple profile workpieces such as planes, rotating bodies, open-curved surface components, and it is more difficult to implement automatic testing for complex-curved surface workpieces such as special components containing grooves, corners and likes because there is inadequate space for the robot to enter the inner space of such workpiece so as to perform testing.

A patent application named ultrasonic waveguide tube with publication No. CN107708581 A discloses an ultrasonic catheter for delivering ultrasonic energy and therapeutic compounds to the treatment site. This document shows that the ultrasound catheter is capable of transmitting ultrasonic waves and sending them to the surface of the workpiece where the robot is difficult to reach so as to perform a quality testing on the workpiece.

SUMMARY

In view of this, a main purpose of the present disclosure is to provide an ultrasonic testing device and a method for testing the quality of a composite material workpiece with complex curved surfaces by using the ultrasonic testing device, thereby realizing a testing on the quality of the composite material workpiece with complex curved surfaces.

One aspect of the present disclosure is to provide an ultrasonic testing device including an ultrasonic transducer (3) arranged with a step (31), comprising:

a liquid storage chamber (12) provided with a liquid inlet (124) on a side thereof, the liquid inlet (124) being communicated with a hollow body of the liquid storage chamber (12), wherein a head portion of the ultrasonic transducer (3) passes through an end of the liquid storage chamber (12) and the step (31) is pressed against the end of the liquid storage chamber (12);

an ultrasonic transducer gland (16) provided with a gland circular groove (161) on an end thereof, wherein a tail portion of the ultrasonic transducer (3) passes through the ultrasonic transducer gland (16) and the step (31) is arranged in the gland circular groove (161);

an ultrasonic transducer holder (13) disposed at a tail portion of the ultrasonic transducer (3), wherein the ultrasonic transducer holder (13) is fixedly connected with the ultrasonic transducer gland (16) and the liquid storage chamber (12);

a jet head (11) provided with a jet nozzle (111) on an end thereof, wherein the other end of the jet head (11) is fixedly connected to and communicated with the other end of the liquid storage chamber (12);

a liquid spoiler (14) arranged in the liquid storage chamber (12) and disposed at the head portion of the ultrasonic transducer (3), wherein liquid through holes (141) communicating the liquid storage chamber (12) and the spray head (11) are arranged on the liquid spoiler (14) in a circumferential direction; and a waveguide tube (15) fixedly connected with the jet nozzle (111), wherein the liquid storage chamber (12), the jet head (11) and the waveguide tube (15) are configured to be hollow in the direction of connection.

As a result, by pumping liquid into the liquid storage chamber (12) through the liquid inlet, the ultrasonic transducer gland (16) presses the through hole on the liquid storage chamber (12) so that the ultrasonic transducer holder (13) and the liquid storage chamber (12) are not communicated to each other. Whereas the liquid storage chamber 12, the jet head 11 and the waveguide tube 15 are communicated in sequence, which allows the coupling liquid to be jetted to the surface of the tested workpiece via the other end of the waveguide tube. Therefore, it is possible to perform non-destructive testing of composite material workpieces with complex curved surfaces which are difficult to be tested by conventional testing systems without this ultrasonic testing device such as robotic ultrasonic testing systems.

Furthermore, by providing the liquid spoiler (14) provided with liquid through holes (141), arranged in the liquid storage chamber (12) and disposed at the head portion of the ultrasonic transducer (3), the coupling liquid in the liquid storage chamber (12) can enter the jet head (11) via the liquid through hole (141), causing the flow state of the coupling liquid to become a laminar flow state, thereby reducing the attenuation of ultrasonic waves in the waveguide tube.

In some embodiments, the liquid storage chamber (12) is arranged with a first circular groove (121), a second circular groove (122) concentric with the first circular groove (121) and having a greater diameter and a smaller depth compared with the first circular groove (121) is provided on an end surface of the first circular groove (121), a circular through hole (123) is provided at a bottom of the first circular groove (121), and the ultrasonic transducer (3) passes through the through hole 123; and an end of the liquid spoiler (14) situated near the jet head (11) is provided with a flange extending along the circumferential direction on the outside thereof, wherein the flange is arranged with the liquid through holes (141) arranged in the circumferential direction, and the flange is placed in the second circular groove (122).

As a result, the flange of the liquid spoiler (14) is placed in the second circular groove (122), the vertical displacement of the liquid spoiler is limited by the second circular groove (122), and the lateral displacement of the liquid spoiler is limited by the second circular groove (122) and the jet head (11), so that the position of ultrasonic transducer 3 is relatively fixed.

In some embodiments, the curvature of the waveguide tube (15) is not greater than 90 degrees.

As a result, the curvature of the waveguide tube (15) is not greater than 90 degrees, which reduces the number of reflections of ultrasound waves inside the waveguide tube, thereby reducing the attenuation of ultrasound waves.

Another aspect of the present disclosure is to provide an ultrasonic testing method using the above ultrasonic testing devices, comprising:

providing two ultrasonic testing devices without waveguide tube (15) on both sides of a tested workpiece, respectively;

fixedly connecting the waveguide tube (15) to the jet nozzle (111) placed on one or both sides of the tested workpiece, wherein in the case where the waveguide tube (15) is mounted on one side of the tested workpiece, it is ensured that an end of the waveguide tube (15) facing the surface of the tested workpiece and the jet nozzle (111) without the waveguide tube (15) are perpendicular to the surface of the tested workpiece and their center lines coincide, and in the case where the waveguide tubes (15) are mounted on both sides of the tested workpiece, it is ensured that the ends of the waveguide tubes (15) facing the surface of the tested workpiece are perpendicular to the surface of the tested workpiece and their center lines coincide;

pumping the coupling liquid into the two liquid inlets (124), so that the coupling liquid is jetted from the ends of the waveguide tubes (15) facing the surface of the tested workpiece or from the end of the waveguide tube (15) on one side of the workpiece and the jet nozzle (111) on the other side of the workpiece, to the surface of the tested workpiece;

simultaneously activating the ultrasonic transducers on the two ultrasonic testing devices on both sides of the tested workpiece, and displaying the emitted and received ultrasonic signals by a pulse transceiver to check the quality of the tested workpiece.

As a result, by providing the two ultrasonic testing devices on both sides of the tested workpiece, respectively, and by mounting the waveguide tube(s) on one side or both side of ultrasonic testing devices, the coupling liquid enters the first circular groove in the liquid storage chamber via the liquid inlet and jets from the end of the waveguide tube fixedly connected with the jet head facing the surface of the tested workpiece to the surface of the tested workpiece, and the ultrasonic waves in the coupling liquid is transmitted to the surface of the tested workpiece, thereby realizing emitting, transmitting and receiving of the ultrasonic waves. Then the quality of the tested workpiece can be determined based on the received ultrasonic signals. The method is simple in operation, reliable in testing results, and the waveguide tube is portable and reusable. It solves the outstanding problem of how to perform a quality testing on a composite material workpiece with complex curved surfaces.

DETAILED DESCRIPTION OF THE DRAWINGS

Figure 2:
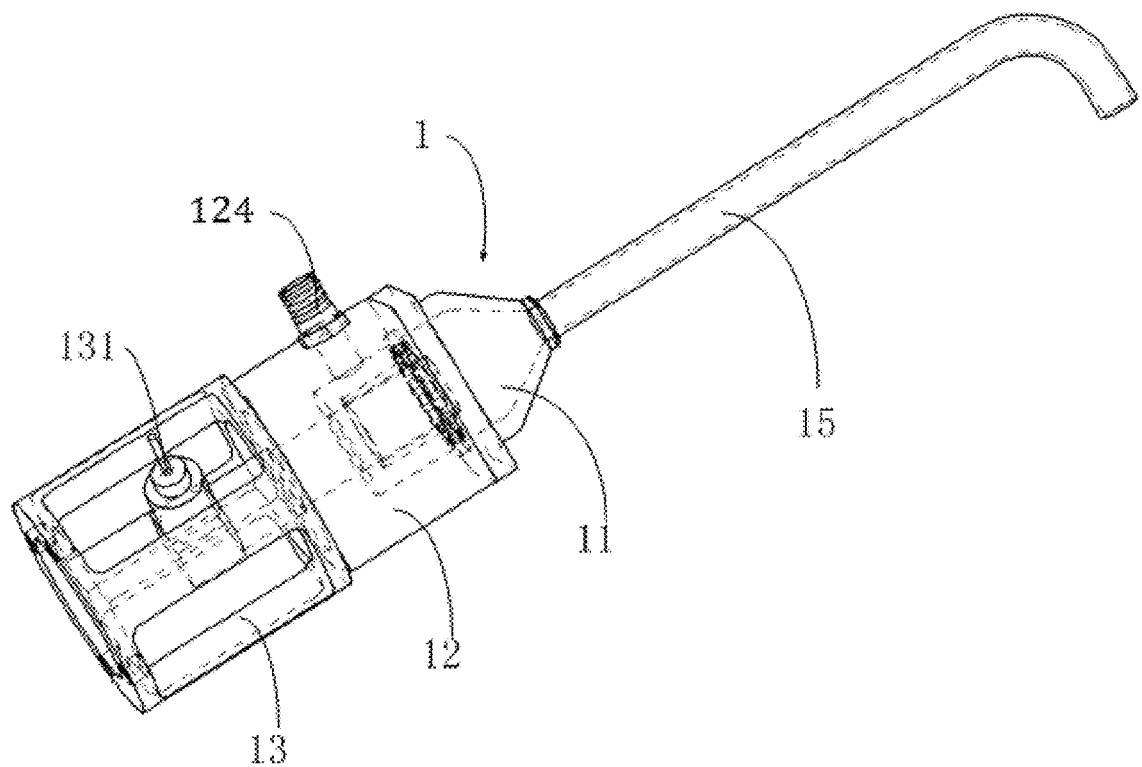
Figure 3:
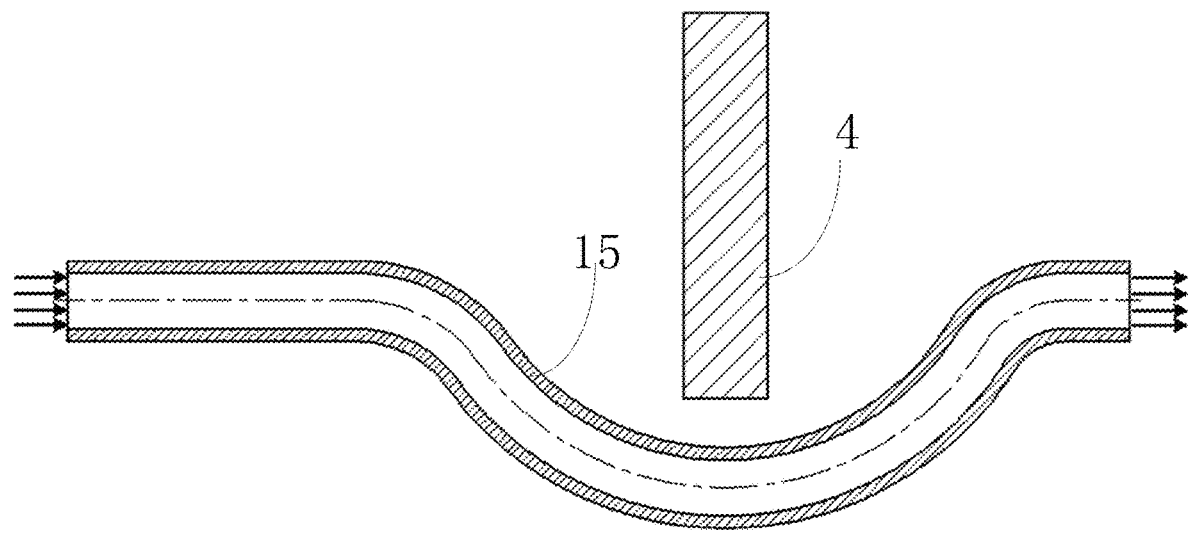
Figure 4:
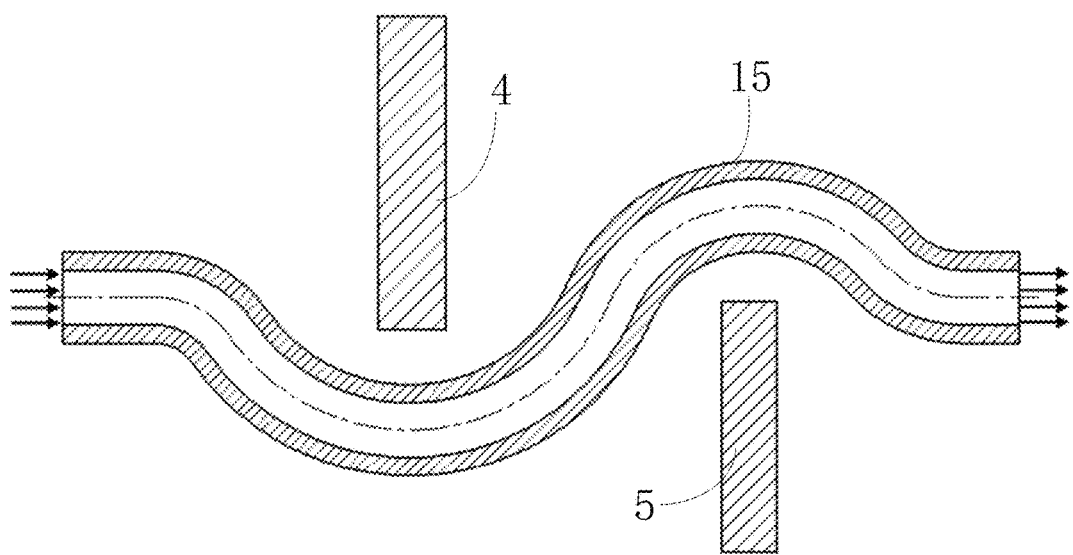
Figure 5:
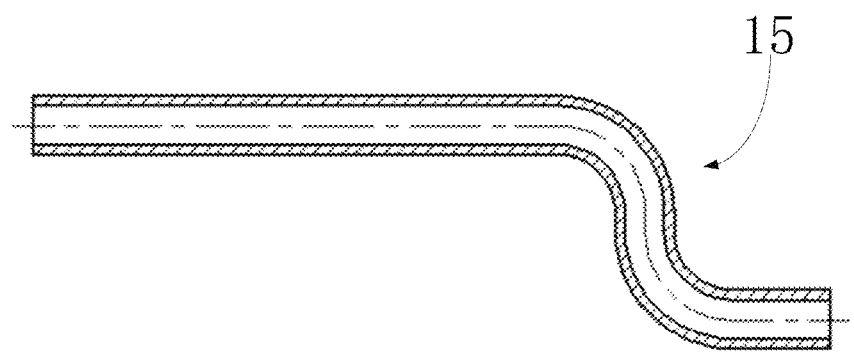
Figure 6:
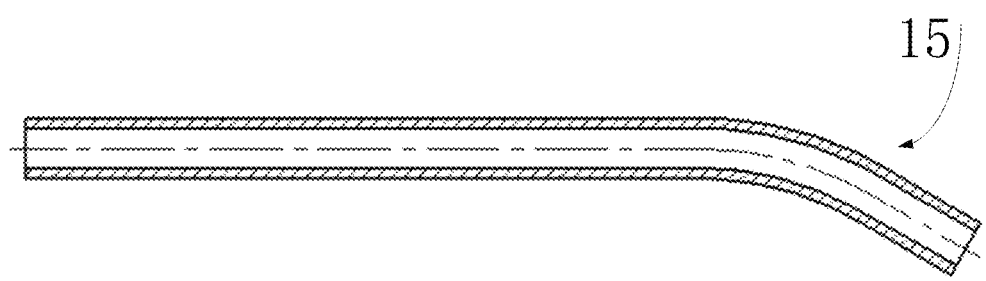
Figure 7:
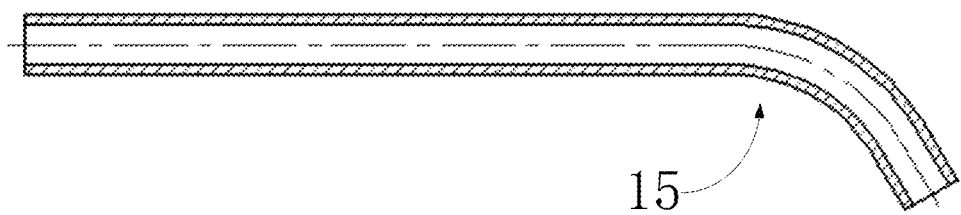
Figures 8, 9, 10:
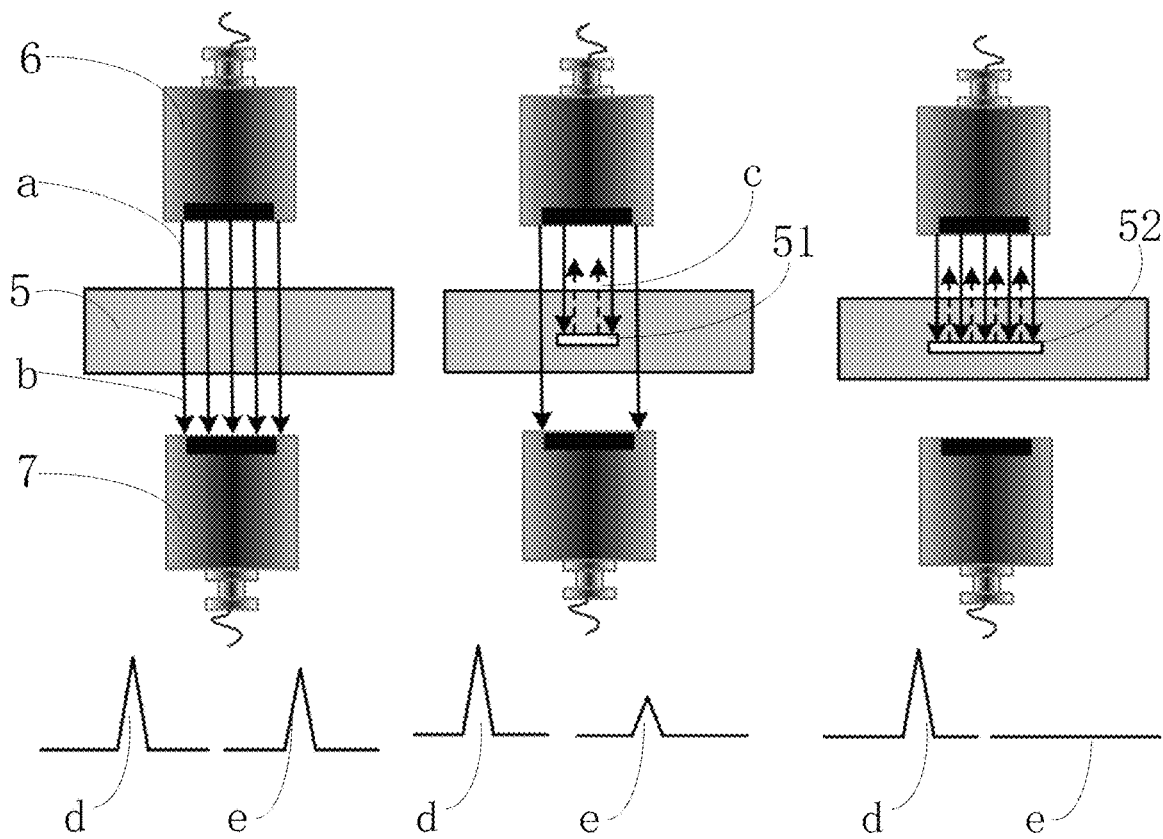
Figure 11:
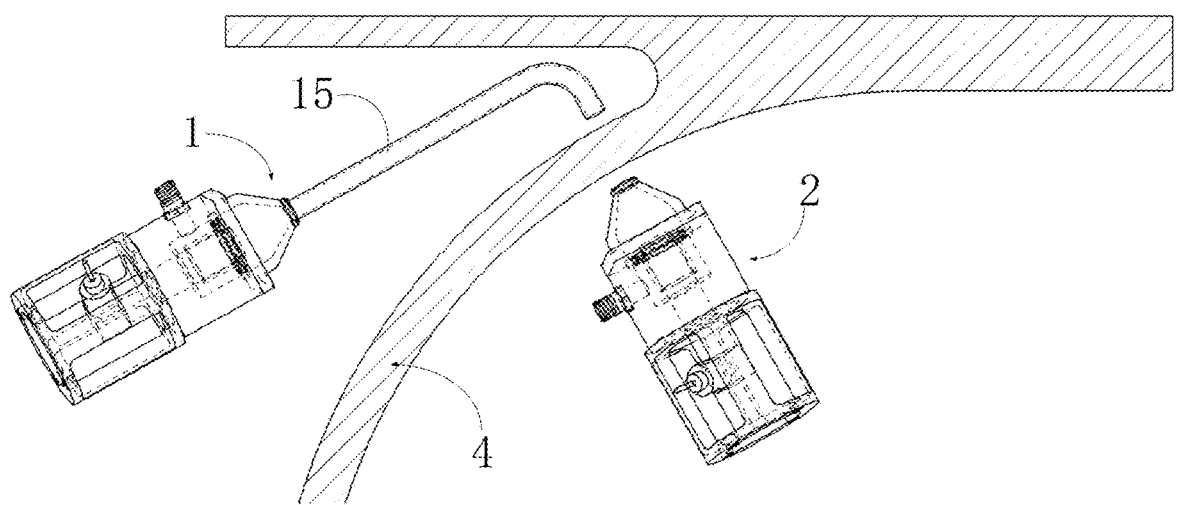

FIG. 1 is a schematic diagram of the internal structure of an ultrasonic testing device according to an embodiment of the present disclosure, FIG. 2 is a schematic diagram of the external structure of the ultrasonic testing device according to an embodiment of the present disclosure, FIG. 3 is a schematic diagram of a structure of a waveguide tube, FIG. 4 is a further schematic diagram of the structure of the waveguide tube, FIG. 5 is a further schematic diagram of the structure of the waveguide tube, FIG. 6 is a further schematic diagram of the structure of the waveguide tube, FIG. 7 is a further schematic diagram of the structure of the waveguide tube, FIG. 8 is a schematic diagram of a principle of an ultrasonic testing method according to an embodiment of the present disclosure, FIG. 9 is a further schematic diagram of the principle of the ultrasonic testing method according to an embodiment of the present disclosure, FIG. 10 is a further schematic diagram of the principle of the ultrasonic testing method according to an embodiment of the present disclosure, and FIG. 11 is a schematic diagram of a structure when using the ultrasonic testing device shown in FIG. 1 to test a workpiece.

DETAILED DESCRIPTION

FIGS. 1 and 2 show an ultrasonic testing device. This ultrasonic testing device includes a waveguide tube 15, a jet head 11, a liquid storage chamber 12, an ultrasonic transducer gland 16, and an ultrasonic transducer holder 13, which are sequentially connected by bolts and nuts and are configured to be hollow in the direction of connection. One end of a step 31 on a ultrasonic transducer 3 is pressed against an end face of the liquid storage chamber 12, and the other end is pressed into a circular groove on the ultrasonic transducer gland 16, so that front and rear positions of the ultrasonic transducer 3 in the ultrasonic testing device are restricted such that the ultrasonic transducer 3 cannot move back and forth in the ultrasonic testing device. On the another hand, the ultrasonic transducer gland 16 presses the step 31 of the ultrasonic transducer tightly against the end surface of the liquid storage chamber 12, allowing the step 31 to block a through hole 123 of the liquid storage chamber 12, so that the liquid storage chamber 12 and the ultrasonic transducer holder 13 are not liquid-communicated. The liquid storage chamber 12, the jet head 11 and the waveguide tube 15 are liquid-communicated in sequence. A liquid spoiler 14 is arranged inside the liquid storage chamber 12 and is disposed at the head of ultrasonic transducer 3 on the outside of the head. The liquid spoiler 14 is arranged with liquid through holes communicating with the liquid storage chamber 12 and the jet head 11. The liquid storage chamber 12 is arranged on its side with a liquid inlet communicating with its hollow portion. A jet nozzle is arranged at the end of the jet head 11, and the waveguide tube 15 is screwed with the jet nozzle. In this way, a coupling liquid is allowed to enter the liquid storage chamber 12 through the liquid inlet, and then enters the jet head 11 through the liquid through holes, and then enters the waveguide tube 15 through the jet nozzle on the jet head, and finally is jetted out of the other end of the waveguide tube 15 to the surface of the tested workpiece.

This embodiment is described in more detail as follows.

The jet head 11 has a hollow structure with a base arranged at one end thereof. A conical jet head body extends outward from the base, and a jet nozzle 111 is arranged at an end of the jet head body. One end of the waveguide tube 15 is connected to the jet nozzle 111 via threads for facilitating assembly.

The liquid storage chamber 12 is arranged with a first circular groove 121, and a second circular groove 122 concentric with the first circular groove 121 and having a greater diameter and a smaller depth compared with the first circular groove 121 is situated on an end surface of the first circular groove 121. The liquid spoiler 14 may be arranged in the second circular groove 122. The through holes 123 are arranged at the bottom of the first circular groove 121 so that the ultrasonic transducer 3 passes through the through hole 123 and is supported by the liquid storage chamber 12. A liquid inlet 124 communicating with the first circular groove 121 is arranged on one side of the liquid storage chamber 12, and the coupling liquid is pumped into the first circular groove 121 through the liquid inlet 124. Since the step 31 on the ultrasonic transducer 3 blocks the through holes 123, the coupling liquid cannot enter the chamber of the ultrasonic transducer holder 13.

The ultrasonic transducer holder 13 is arranged with a through hole penetrating two opposite end surfaces.

The liquid spoiler 14 has a hollow cylindrical structure, and an end of the liquid spoiler 14 facing the jet head 11 is arranged with a flange extending along the circumferential direction on the outside thereof. The flange is arranged with liquid through holes 141 arranged in the circumferential direction and penetrating the thickness of the flange. The coupling liquid in the liquid storage chamber 12 flows into the jet head 11 through the liquid through holes 141 of the liquid spoiler 14 and then into the waveguide tube 15. In this way, the flow state of the fluid in the waveguide to be 15 is a laminar flow state without turbulence, thereby reducing the propagation attenuation of ultrasonic waves in the waveguide tube.

The waveguide tube 15 is a hollow metal or non-metallic catheter. The inner wall of the waveguide tube 15 should be smooth enough to fully reflect the ultrasonic waves transmitted in the liquid in the waveguide tube so as to minimize energy loss of the sound wave transmitted by the fluid in the waveguide tube. In addition, the curvature of the waveguide tube 15 should not be too large. Generally, the curvature of the waveguide tube 15 does not exceed 90 degrees, so as to reduce the number of reflections of the ultrasonic waves in the waveguide tube, thereby reducing the attenuation of the ultrasonic waves. According to the different installation positions of the tested workpiece, the waveguide tube needs to be bent once or twice to reach the surface of the tested workpiece, as shown in the various shapes in FIGS. 3 to 7. The waveguide tube 15 is simple in structure, lightweight, easy to carry and store, and reusable.

When assembling, the head portion of the ultrasonic transducer 3 firstly passes through the through hole 123 on the bottom of the liquid storage chamber 12, so that the step 31 on the ultrasonic transducer 3 is pressed against the end surface of the liquid storage chamber 12. The tail portion of the ultrasonic transducer 3 then passes through ultrasonic transducer gland 16 so that the step 31 on ultrasonic transducer 3 is placed in gland circular groove 161 on the ultrasonic transducer gland 16, and the liquid storage chamber 12 and the ultrasonic transducer gland 16 are fixedly connected via bolts, so that the position of the ultrasonic transducer 3 is limited. Then the tail portion of the ultrasonic transducer 3 passes through the through hole on the ultrasonic transducer holder 13 and the ultrasonic transducer holder 13 and the ultrasonic transducer gland 16 are fixedly connected via bolts, so that the ultrasonic transducer gland 16 is supported by the ultrasonic transducer holder 13. Subsequently, the liquid spoiler 14 is placed on the head portion of the ultrasonic transducer 3 so that its flange is placed in the second circular groove 122 of the liquid storage chamber 12, and the base of jet head 11 and the liquid storage chamber 12 are fixedly connected via bolts, so that the position of liquid spoiler 14 is limited by the end surfaces of the second circular groove 122 and the jet head 11.

Since the ultrasonic wave has a large attenuation in the composite material workpiece, especially in the workpiece with quality problem, and the signal cannot be received by the reflection testing method in this situation, it is necessary to perform a quality testing on the composite material workpiece by an ultrasonic transmission testing method.

The testing principle of the ultrasonic transmission testing method is shown in FIGS. 8 to 10. An ultrasonic emitting transducer 6 and an ultrasonic receiving transducer 7 are provided on both sides of the workpiece 5, respectively, and the two ultrasonic transducers are both perpendicular to the surface of the workpiece 5. After the emitted ultrasonic waves pass through the workpiece 5, part or all of them are received by the ultrasonic receiving transducer 7 as the received ultrasonic waves e, where d is the emitted ultrasonic signal and e is the received ultrasonic signal. When there is no quality defect in the workpiece, the received ultrasonic signal e is almost equal to the emitted ultrasonic signal d. When there is a small quality defect 51 in the workpiece, the emitted ultrasonic wave a will be reflected and generate a ultrasonic wave c as it encounters the quality defect 51, so that the ultrasonic wave b received by the ultrasonic receiving transducer 7 is reduced, which can be represented on the signals, and as shown in FIG. 9, the ultrasonic signal e received by the ultrasonic receiving transducer 7 is significantly weaker than the ultrasonic signal d emitted by the ultrasonic emitting transducer 6. When there is a large quality defect 52 in the workpiece 5, the ultrasonic waves emitted by the ultrasonic emitting transducer 6 are all reflected by the quality defects 52 in the workpiece and the ultrasonic receiving transducer 7 cannot receive any of the ultrasonic waves, and as shown in FIG. 11, the ultrasonic signal received by the ultrasonic receiving transducer 7 is zero.

FIG. 11 shows an ultrasonic testing method, which uses the ultrasonic testing device described above to perform a quality testing on a workpiece of composite material or other materials. When using the ultrasonic testing device to test the quality of the surface and interior of the workpiece, it is required to provide two ultrasonic testing devices on both sides of the workpiece, respectively, one for emitting ultrasonic waves and the other for receiving ultrasonic waves. The waveguide tube 15 may be provided on the jet nozzle 111 of the jet head 11 on one side or both sides based on the installation of the tested workpiece. The end of waveguide tube 15 facing the surface of the workpiece is perpendicular to the surface of the workpiece during the testing. If the waveguide tube is only provided on one side, the end of the waveguide tube 15 on the side of the tested workpiece facing the surface of the workpiece and the jet nozzle 111 of the jet head 11 on the other side of the tested workpiece are both perpendicular to the surface of the workpiece and their center lines coincide. If the waveguide tubes are provided on both sides, the ends of the two waveguide tubes facing the surface of the workpiece are perpendicular to the surface of the workpiece, and the center lines of the two ends coincide. In this way, the ultrasonic waves are transmitted to the surface of the tested workpiece with the help of the waveguide tubes, realizing the quality testing on the composite material workpiece with complex curved surfaces.

When performing quality testing on a workpiece, two ultrasonic testing devices not connected to the waveguide tube 15 are firstly provided on both sides of the tested workpiece, respectively, and the waveguide tube 15 is fixed on the jet nozzle 111 of the jet head 11 on one side or both sides. When the waveguide tube 15 is mounted on one side of the tested workpiece, it is ensured that the end of the waveguide tube 15 facing the surface of the tested workpiece and the jet nozzle 111 on which the waveguide tube 15 is not mounted are perpendicular to the surface of the tested workpiece and their center lines coincide. When the waveguide tubes 15 are mounted on both sides of the tested workpiece, it is ensured that the ends of the waveguide tubes 15 facing the surface of the tested workpiece are perpendicular to the surface of the tested workpiece and their center lines coincide. The coupling liquid is pumped into the two liquid inlets 124, so that the coupling liquid is jetted from the end of the waveguide tube 15 and the jet nozzle not connected to the waveguide tube to the surface of the tested workpiece. The ultrasonic transducers on the two ultrasonic testing devices are activated simultaneously to perform the quality testing on the tested workpiece.

The present disclosure proposes an ultrasonic non-destructive testing method for workpieces with complex curved surface by means of the designed hollow waveguide tube. After a large number of researches and experimental verifications, it is found that this solution is feasible, its implementation is simple, and its test results are reliable and repeatable, which solves the problem of ultrasonic testing of complex components.

The above is only the preferred embodiments of the present disclosure and is not intended to limit the present disclosure. Any modifications, equivalent replacements, improvements and likes made within the spirit and principles of the present disclosure should be included in the scope of protection of the present disclosure.

The invention claimed is:

1. An ultrasonic testing device including an ultrasonic transducer provided with a step, comprising:
    a liquid storage chamber provided with a liquid inlet on a side thereof, the liquid inlet being communicated with a hollow body of the liquid storage chamber, wherein a head portion of the ultrasonic transducer passes through an end of the liquid storage chamber and the step is pressed against the end of the liquid storage chamber;
    an ultrasonic transducer gland provided with a gland circular groove on an end thereof, wherein a tail portion of the ultrasonic transducer passes through the ultrasonic transducer gland and the step is arranged in the gland circular groove;
    an ultrasonic transducer holder disposed at a tail portion of the ultrasonic transducer, wherein the ultrasonic transducer holder is fixedly connected with the ultrasonic transducer gland and the liquid storage chamber;
    a jet head provided with a jet nozzle on an end thereof, wherein the other end of the jet head is fixedly connected to and communicated with the other end of the liquid storage chamber;
    a liquid spoiler arranged in the liquid storage chamber and disposed at the head portion of the ultrasonic transducer, wherein liquid through holes communicating the liquid storage chamber and the spray head are arranged on the liquid spoiler in a circumferential direction; and
    a waveguide tube fixedly connected with the jet nozzle, wherein the liquid storage chamber, the jet head and the waveguide tube are configured to be hollow in the direction of connection.

2. The ultrasonic testing device as claimed in claim 1, wherein the liquid storage chamber is arranged with a first circular groove, a second circular groove concentric with the first circular groove and having a greater diameter and a smaller depth compared with the first circular groove is provided on an end surface of the first circular groove, a through hole is provided at a bottom of the first circular groove, and the ultrasonic transducer passes through the through hole; and
    an end of the liquid spoiler situated near the jet head is provided with a flange extending along the circumferential direction on the outside thereof, wherein the flange is arranged with the liquid through holes arranged in the circumferential direction, and the flange is placed in the second circular groove.

3. The ultrasonic testing device as claimed in claim 1, wherein a curvature of the waveguide tube is not greater than 90 degrees.

4. An ultrasonic testing method using the ultrasonic testing device as claimed in claim 1, comprising:
    providing two ultrasonic testing devices without waveguide tube on both sides of a tested workpiece, respectively;
    fixedly connecting the waveguide tube to the jet nozzle placed on one or both sides of the tested workpiece, wherein in the case where the waveguide tube is mount on one side of the tested workpiece, it is ensured that an end of the waveguide tube facing the surface of the tested workpiece and the jet nozzle without the waveguide tube are perpendicular to the surface of the tested workpiece and their center lines coincide, and in the case
    where the waveguide tubes are mount on both sides of the tested workpiece, it is ensured that the ends of the waveguide tubes facing the surface of the tested workpiece are perpendicular to the surface of the tested workpiece and their center lines coincide;
    pumping a coupling liquid into two liquid inlets arranged on both sides of the tested workpiece, so that the coupling liquid is jetted from the ends of the waveguide tubes facing the surface of the tested workpiece or from the end of the waveguide tube on one side of the tested workpiece and the jet nozzle on the other side of the tested workpiece, to the surface of the tested workpiece; and
    simultaneously activating the ultrasonic transducers on the two ultrasonic testing devices on both sides of the tested workpiece, and displaying the emitted and received ultrasonic signals by a pulse transceiver to check quality of the tested workpiece.

* * * * *

UNITED STATES PATENT AND TRADEMARK OFFICE
CERTIFICATE OF CORRECTION

PATENT NO. : 10,989,696 B2
APPLICATION NO. : 16/910993
DATED : April 27, 2021
INVENTOR(S) : Chunguang Xu et al.

It is certified that error appears in the above-identified patent and that said Letters Patent is hereby corrected as shown below:

In the Specification

In Column 1, Line 1 under the heading "CROSS REFERENCE RELATED TO APPLICATIONS" reads:
"This application claims the benefit of U.S. Provisional Application No.201910702849.6, filed on July 31, 2019."

It should read:
"This application claims priority to China Patent Application No. 201910702849.6, filed on July 31, 2019."

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*